UNITED STATES PATENT OFFICE.

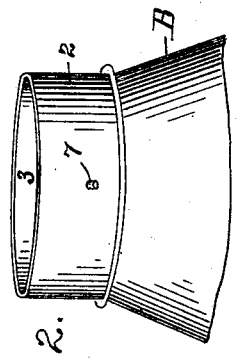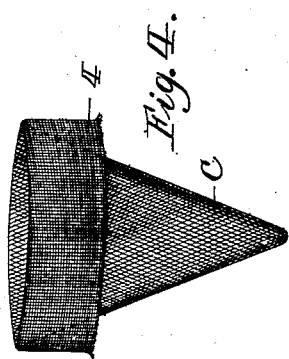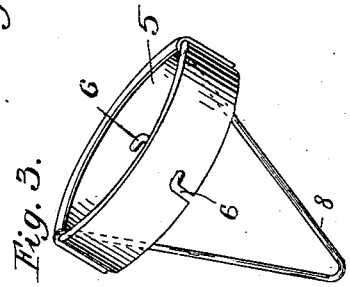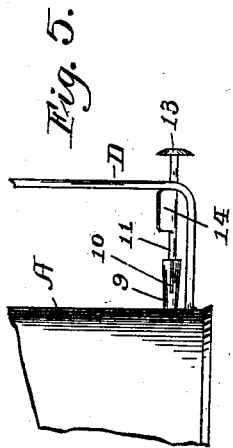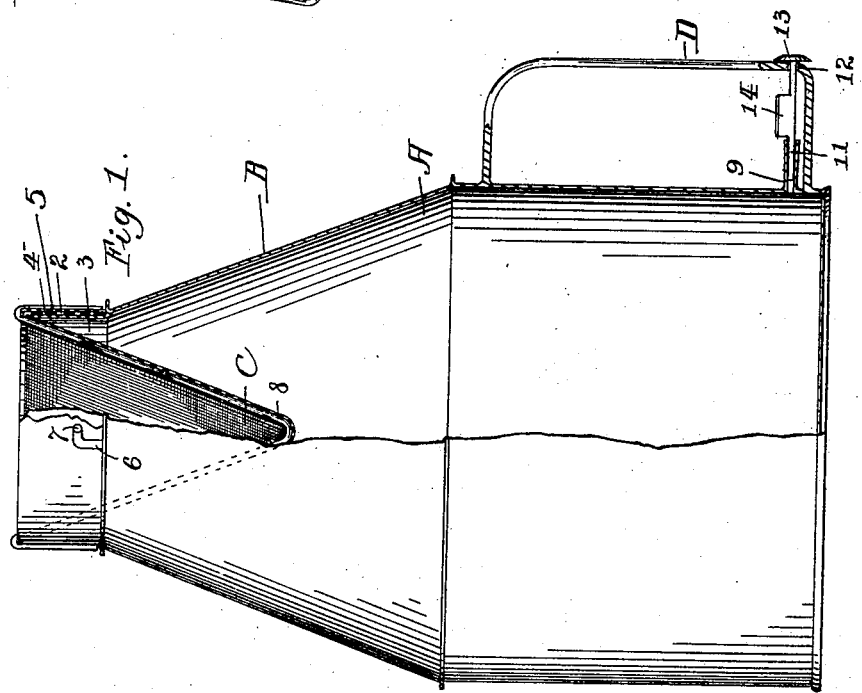

THOMAS K. BAKER, OF MINNEAPOLIS, MINNESOTA.

COFFEE-MAKER.

SPECIFICATION forming part of Letters Patent No. 710,132, dated September 30, 1902.

Application filed November 11, 1901. Serial No. 81,810. (No model.)

*To all whom it may concern:*

Be it known that I, THOMAS K. BAKER, a citizen of the United States of America, and a resident of Minneapolis, in the county of Hennepin and State of Minnesota, have invented certain new and useful Improvements in Coffee-Makers, of which the following is a specification.

My invention relates to improvements in coffee-makers. Its object is the production of a coffee-maker that may be used in conjunction with an ordinary coffee-pot or receiver and which will not clog when the liquid coffee is strained into such receiver.

A further object is the production of a simple and cheap coffee-maker in which the minimum amount of the aroma of the coffee is lost by admitting air during the process of infusion.

My invention consists of a can or other vessel closed at one end and terminating at the other in a truncated funnel into which a conical strainer, with its apex projecting into said open end, is inserted. While the coffee is being infused the vessel stands upon its closed end, after which it is inverted, with the funnel in the top of the coffee-pot to be used, and the beverage quickly strains into such pot.

My coffee-maker is particularly, though not exclusively, adapted to the use of pulverized coffee. So-called "French" coffee-pots, while intended for the use of pulverized coffee, depend for the infusion of the liquid upon allowing the hot water merely to percolate through the powder. This process is wasteful, as much of the strength of the coffee-bean remains in the grounds. My device allows the coffee to be immersed in boiling water, or, if preferred, the coffee may be boiled in the water. Such immersion of pulverized coffee necessitates straining, and this can best be done by the use of a conical strainer and from a vessel other than that in which the coffee is to be served upon the table. The funnel-shaped end of the coffee-maker adapts it for use in connection with any ordinary coffee-pot without regard to the exact size of the opening in its top and also permits the vessel to stand in the open coffee-pot while the process of emptying continues without being held in position.

In the accompanying drawings, forming part of this specification, Figure 1 is a side elevation of my improved coffee-maker, shown partly in section. Fig. 2 is a detail perspective view of the open end of the coffee-maker, showing the strainer and its means of attachment removed. Fig. 3 is a perspective view of the collar by which the strainer is attached to the vessel. Fig. 4 is a perspective view of the strainer; and Fig. 5 is a detail side elevation of the coffee-maker, showing the valve open.

In the drawings let A represent the coffee-maker, which is formed with open tapering end B and provided with a circular flange 2, which surrounds the opening or mouth 3 of the vessel. The strainer C, made of cloth or other suitable material, is preferably conical in form. The collar 5 is adapted to clamp its edge 4 over the flange 2 and is locked in position by means of the channels 6 in the collar and the pins 7 on the flange, as shown in Fig. 1. The collar 5 is provided with a V-shaped frame 8, which projects into the vessel, as shown in Fig. 1, and is adapted to hold the strainer extended.

It is obvious that when the coffee-maker is in use boiling water may be poured upon pulverized coffee, or either pulverized or granulated coffee may be boiled in the vessel. When the coffee and water are in the vessel, the strainer may be attached by the collar 5, which is locked on the flange. After the coffee is made the vessel is tilted or inverted, with the funnel end in a coffee-pot, and the coffee flows into such receptacle ready for use. While the coffee is emptying from the maker the coffee-grounds gather on the strainer near the mouth of the vessel, leaving the inner end of the strainer practically free from grounds, and thus expediting the flow of the coffee.

It is obvious that the shape of the strainer need not be conical to perform this function—*i. e.*, it may be cylindrical or slightly tapered and still strain the coffee quickly. It should not, however, be stretched flat over the mouth of the funnel.

The valve shown in the drawings consists of a tube 9, which projects from the side near the base of the vessel. This tube is slotted at 10. The valve-rod 11 slides in this tube and through the opening 12 in the handle D and may be operated by the handpiece 13. A lug 14 on the side of the valve-rod regulates its movement. The valve-rod is withdrawn, as shown in Fig. 5, while the vessel is inverted to transfer the coffee to the coffee-pot, so that air may enter the vessel to compensate for the atmospheric pressure on the outside, and thus facilitate the flow. It is obvious that this valve may be constructed to perform its function automatically, or a mere perforation with a stopper will serve the same purpose, such devices being mere equivalents of the valve described by me.

Having described my invention, what I claim as new, and desire to protect by Letters Patent, is—

1. A device of the class described, consisting of a can tapering toward an open end for the purpose of fitting different-sized apertures in coffee-pots, a collar, and a conical strainer removably attached to the open end of the can by said collar, with its apex projecting into said end; whereby, when the can is inverted, the liquid coffee is strained through said opening.

2. A device of the class described, consisting of a vessel having a tapering end for the purpose of fitting different-sized openings in coffee-pots, an opening in said tapering end, a strainer with a reverse taper in said opening, a collar by which the strainer is detachably fastened to said vessel, and a frame carried by said collar for holding said strainer in position when the vessel is tilted or inverted.

3. A device of the class set forth, consisting in combination of a vessel closed at one end and having a truncated funnel at the other for the purpose of fitting different-sized openings in coffee-pots, a flange around the mouth of said funnel, a tapering strainer reversed in said funnel with its outer edge overlapping said flange, a collar by which said overlapping edge is clamped to said flange, a tapering frame, carried by said collar, adapted to support the apex end of said strainer in said vessel, and an air-valve near the bottom of the vessel.

4. A device of the class set forth, consisting in combination of a vessel A, tapering toward an open end B, a circular flange around said open end, a conical strainer C, a collar 5 by which said strainer is attached to said flange, a V-shaped frame 8 carried by said collar, by which one end of said strainer projects through said opening and into said vessel, and a valve near the bottom of the vessel.

In testimony whereof I have signed my name to this specification in the presence of two subscribing witnesses.

THOMAS K. BAKER.

Witnesses:
F. G. BRADBURY,
JOHN E. STRYKER.